United States Patent [19]

Fujioka

[11] Patent Number: 5,206,938
[45] Date of Patent: Apr. 27, 1993

[54] IC CARD WITH MEMORY AREA PROTECTION BASED ON ADDRESS LINE RESTRICTION

[75] Inventor: Shuzo Fujioka, Itami, Japan

[73] Assignee: Mitsubishi Denki Kabushiki Kaisha, Tokyo, Japan

[21] Appl. No.: 398,509

[22] Filed: Aug. 25, 1989

[30] Foreign Application Priority Data

May 9, 1989 [JP] Japan ................... 1-114246

[51] Int. Cl.5 ............. G06F 12/14; G06F 12/16; G06K 5/00; G11C 7/00
[52] U.S. Cl. .................... 395/400; 395/425; 235/380; 235/382; 365/195; 365/228
[58] Field of Search .......... 395/425, 375, 400; 235/380, 382, 382.5; 365/195, 228; 371/16.1

[56] References Cited

U.S. PATENT DOCUMENTS

| | | | |
|---|---|---|---|
| 4,569,048 | 2/1986 | Sargent | 395/425 |
| 4,875,156 | 10/1989 | Tanagawa et al. | 395/375 |
| 4,930,129 | 5/1990 | Takahira | 235/380 X |
| 5,016,212 | 5/1991 | Yamaguchi et al. | 395/375 |
| 5,019,970 | 5/1991 | Yamaguchi et al. | 395/375 |
| 5,067,077 | 11/1991 | Wakimoto et al. | 395/400 |

FOREIGN PATENT DOCUMENTS

| | | |
|---|---|---|
| 0109504 | 5/1984 | European Pat. Off. . |
| 2371731 | 6/1978 | France . |
| 2592974 | 7/1987 | France . |
| 1504196 | 3/1978 | United Kingdom . |

OTHER PUBLICATIONS

Nikkei Electronics, No. 404, Sep. 22, 1986, pp. 133-144.

Primary Examiner—Joseph L. Dixon
Assistant Examiner—Michael A. Whitfield
Attorney, Agent, or Firm—Leydig, Voit & Mayer

[57] ABSTRACT

An IC card including application programs and a test program for a product test wherein in order to protect a predetermined region on a memory map, during an execution of the application programs, including a portion in which a pass code for providing security regarding accessing the test program is stored against an assignment, an address restriction circuit disposed on an address bus acting to restrict the value of predetermined digit of the address to thus restrict the regions capable of being accessed.

7 Claims, 4 Drawing Sheets

IC CARD WITH MEMORY AREA PROTECTION BASED ON ADDRESS LINE RESTRICTION

BACKGROUND OF THE INVENTION

1. Field of the Invention

The present invention relates to an IC card, and, more particularly, to an IC card which stores an application program for performing various functions required for using the IC card as well as storing a test program for testing the IC card itself (product test).

2. Description of the Related Art

Since the test program makes the IC card perform its function test (product test), it can access any desired address in the memory of the IC card. Therefore, accessing of the test program must be highly secure to protect against any unauthorized intrusion into other programs in the IC card via the test program for copying or destroying such programs upon reading thereof or changing the contents of those programs. Therefore, IC cards are arranged so that a pass code is previously stored therein, said pass code always being subjected to a collation action before accessing of the test program. FIG. 1 is a block diagram which schematically illustrates the structure of a conventional IC card. An IC card 10 is designed such that a system ROM 3, an application ROM 4, an EEPROM 5, a RAM 6, and an I/O circuit 7 are respectively connected to a CPU 1 via an internal bus 2. In order to provide security for accessing of the test program, a pass code 51 and a setting confirmation code 52 for confirming the fact that the pass code 51 has been written and stored in the EEPROM 5. A terminal P1 is a positive power source input terminal, a terminal P2 is an earth terminal for the power source, a terminal P3 is a reset signal terminal for inputting a reset signal for initializing each block, a terminal P4 is a clock terminal to which a clock signal is input, and a terminal P5 is an I/O terminal, the IC card being connectable to external equipment through these terminals P1 to P5. FIG. 2 is a flow chart which illustrates the structures of programs respectively stored in the system ROM 3 serving as a second read only memory and the application ROM 4 serving as a first read only memory. An application program or programs 41 stored in the application ROM 4 are programs for performing various functions which are actually used by users of the IC card. A test program 31 stored in the system ROM 3 is a program for performing the functional test of the IC card 10. A branch routine 32 determines whether the test program 31 or the application program 41 is to be executed and branches to the selected program. A setting confirmation routine 33 and a pass code collation routine 34 provide security for accessing of the test program 31. The pass code 51 and the setting confirmation code 52 are written and stored in the EEPROM 5 serving as a non-volatile memory in the IC card, for example, before forwarding of the IC card from the manufacture. When the test program 31 is accessed after the forwarding of the IC card, this pass code 51 and a pass code input from outside of the IC card are always collated with each other before this accessing. As a result, only when the above pass codes coincide with each other is the accessing of the test program 31 allowed. The above collation action is performed in accordance with the pass code collation routine 34. Further, the setting confirmation code 52 serving as a write confirmation code, indicating whether or not the pass code has been stored is written in the EEPROM 5 so that it can be determined whether or not the pass code 51 has already be stored in accordance with this setting confirmation code 52. The above-confirmation action is performed in accordance with the setting confirmation routine 33. The setting confirmation code 52 must be selected so as not to overlap the initial value of the EEPROM 5 at the time of manufacturing the IC card.

The above will be described in order with reference to FIGS. 1 and 2. When a reset signal is input from the outside of the IC card to the reset signal terminal P3, the CPU 1 reads out an execution start address, which is previously stored at a given address in the system ROM 3, to start execution of the branch routine 32 from the execution start address. In the branch routine 32, the CPU 1 executes the setting confirmation routine 33 when a command to execute the test program 31 is input to the I/O terminal P5 from the outside. In the setting confirmation routine 33, it is determined whether the pass code 51 has already been written in the EEPROM 5 in accordance with the setting confirmation code 52 stored in the EEPROM 5. If the pass code 51 has already been written, the pass code collation routine 34 is executed. If the pass code 51 has not yet been written (for example, where the test program is executed during the manufacturing process), the test program 31 may be directly executed without collation of the pass code. In the pass code collation routine 34, collation between the pass code 51 written in the EEPROM 5 and the pass code input to the I/O terminal P5 is made. Only when the two pass codes coincide with each other can the test program 31 be executed. If they do not coincide, the action is stopped. When the test program is executed during the manufacturing process, another pass code (not illustrated), may be stored in the system ROM in which the test program is stored, whereby a collation with this pass code may be made. Using a common pass code for all of the IC cards during manufacture is convenient and, therefore, the pass code to be stored in the system ROM is usually common to each and every IC card. The pass code written in the system ROM cannot be rewritten. Further, there are also IC cards in which all of the inner structures shown in FIG. 1 are formed on one semiconductor IC.

Conventional IC cards are structured as described above and the pass codes are stored either in the EEPROM serving as a non-volatile memory or in the system ROM in which the test program and the above routines have been stored. However, if a pass code is stored in the system ROM in which the test program and the routines have been stored, the stored pass code cannot be changed. On the other hand, if the code is stored in the EEPROM, the stored pass code can be read ascertained and rewritten by anyone because the pass code can be read out from the application programs used by users.

SUMMARY OF THE INVENTION

An object of the present invention is therefore to provide an IC card capable of overcoming the above-described programs, wherein a pass code stored therein can be changed through the test program but cannot be accessed through the application programs.

In view of the above-described object, in the present invention, an address restriction means is provided on the address bus in order to create a region in an EEPROM to which access is permitted only during execution of the test program, and the pass code is written in this region in the EEPROM.

Therefore, the present invention provides an IC card including a test program for a product test that comprises: non-volatile write enable memory means in which a pass code for providing security regarding accessing of test program is written; read only memory means storing the test program, at least one application program for executing various functions for the purpose of using the IC card, a branch routine for determining whether the test program or the application program is to be executed, and pass code collation routines for collating the pass code with a pass code input from outside of the IC card before accessing of the test program; control means for executing and controlling each of the programs; input output control means for controlling input and output of signals to and from the outside of the IC card; signal transmitting means including address buses, data buses and control lines for transmitting signals between the respective means; and address restriction means for restricting an address bit value of a predetermined digit in the address in order to prohibit accessing of at least a region in the non-volatile storage means during execution of the application program, said region including the portion in which the pass code is stored, the address restriction means being disposed on one of the address buses connected to the control means.

According to the present invention, even if the address in the region in which the pass code has been written is assigned during execution of the application program, the thus-assigned address can be switched to an address in another region (this region does not include the pass code) by the address restriction means.

DESCRIPTION OF THE PREFERRED EMBODIMENTS

An embodiment of the present invention will now be described with reference to the drawings.

Figure 1:
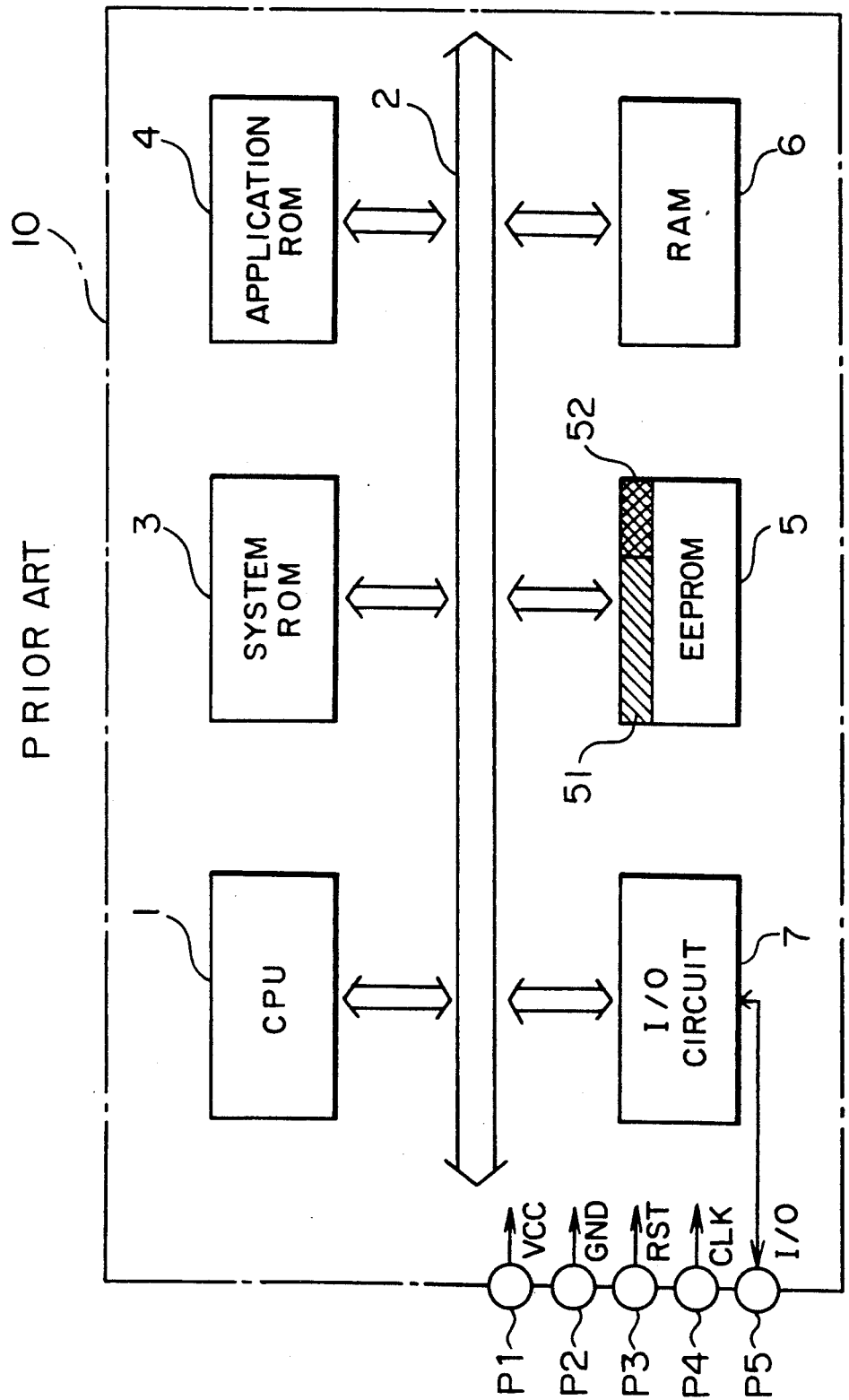
FIG. 1 is a block diagram which schematically illustrates the internal structure of a conventional IC card.
Figure 2:
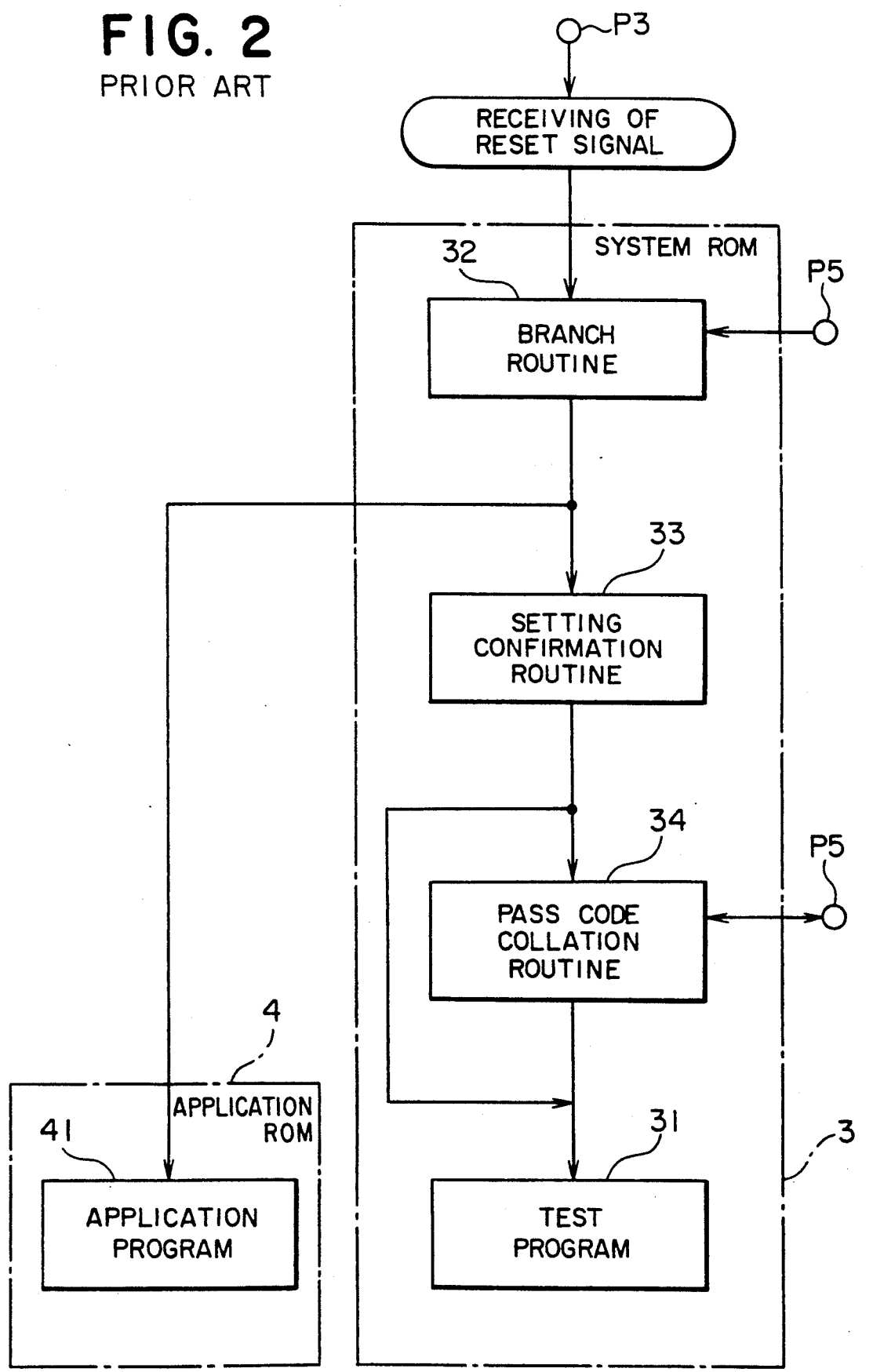
FIG. 2 is a flow chart which illustrates the structure of a program stored in ROM portions of the IC card shown in FIG. 1.

In an IC card according to an embodiment of the present invention, in order to create a region in the EEPROM 5 to which no access can be obtained except during execution of the test program, an address restriction circuit 100 is provided on an address bus 2a disposed between an internal bus 2 and a CPU 1, this internal bus 2 including an address bus, a data bus, and various control lines. This address restriction circuit 100 is provided on the upper two address bit lines AD14 and AD15 in the address bus 2a, and comprises an inverter circuit 101, first and second AND circuits 102 and 104, and a flip flop circuit 103 (designated F.F.). An uppermost address bit line AD15 is connected to the input terminal of the inverter circuit 101. The output terminal of the inverter circuit 101 and the secondary upper address bit line AD14 are connected to the input terminals of the first AND circuit 102 respectively. The output terminal of the first AND circuit 102 is connected to the input terminal of the F.F. circuit 103. The output terminal of the F.F. circuit 103 and the address bit line AD15 are connected to the input terminals of the second AND circuit 104 so that the output therefrom becomes the uppermost address bit AD15a in practice. Since structure other than that described above and the structure of the programs stored in the system ROM 3 and in the application ROM 4 are the same as those of the conventional IC card shown in FIGS. 1 and 2, the descriptions thereof are omitted here.

Figure 3:
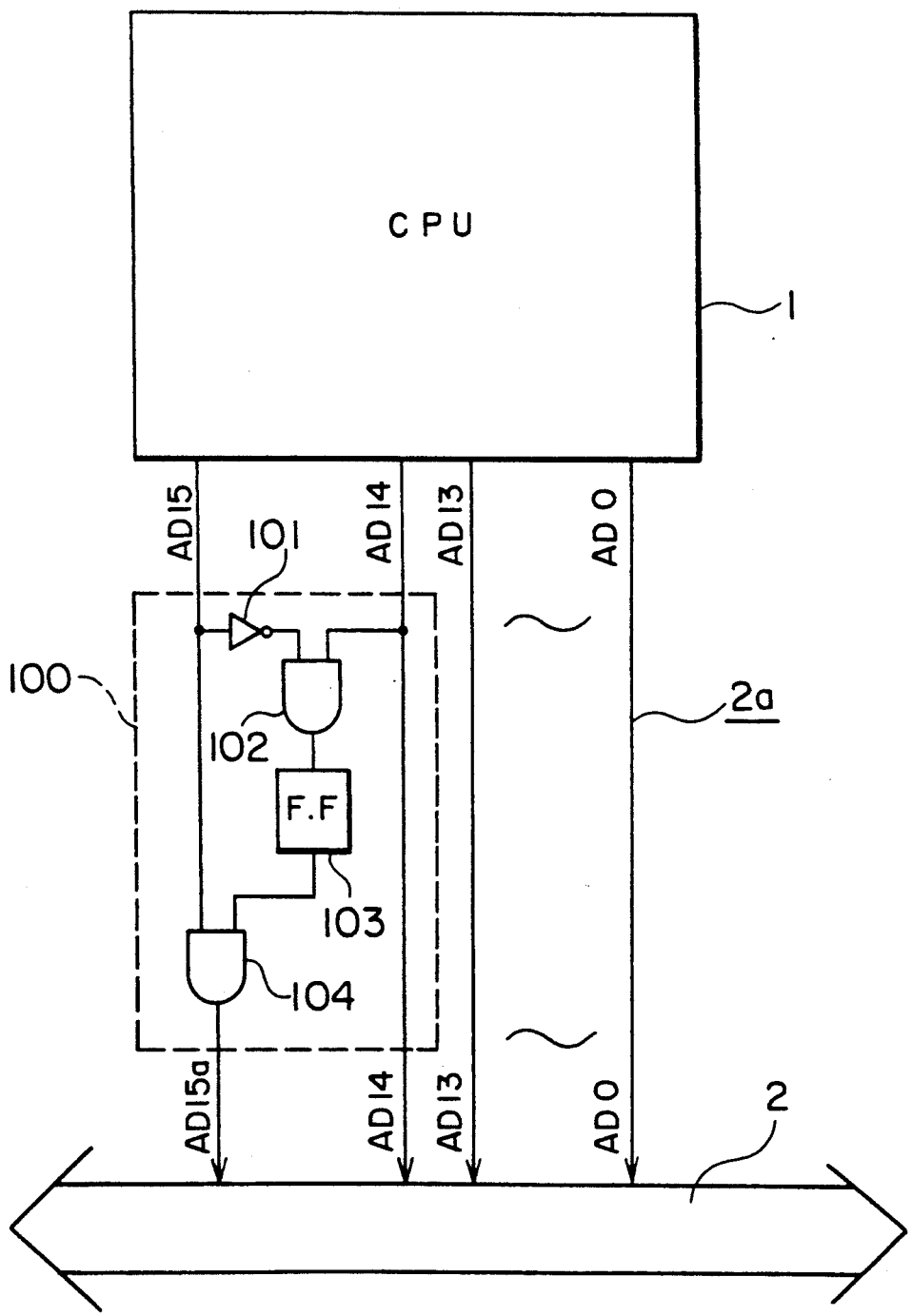
FIG. 3 is a circuit diagram which illustrates the structure of an address restriction circuit provided in an IC card according to the present invention.
Figure 4A:
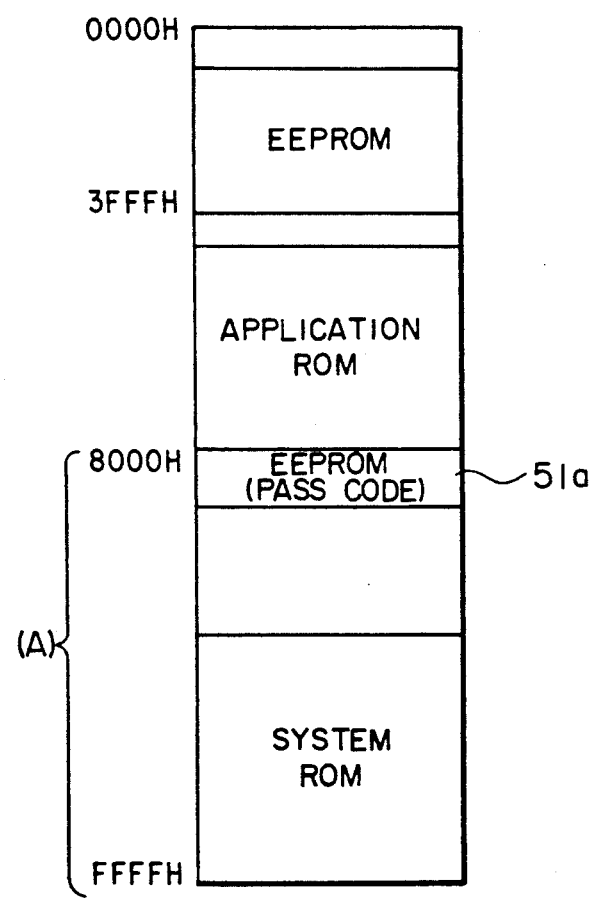
FIGS. 4A and 4B are views which illustrate the switching of memory maps by the address restriction circuit shown in FIG. 3.
Figure 4B:
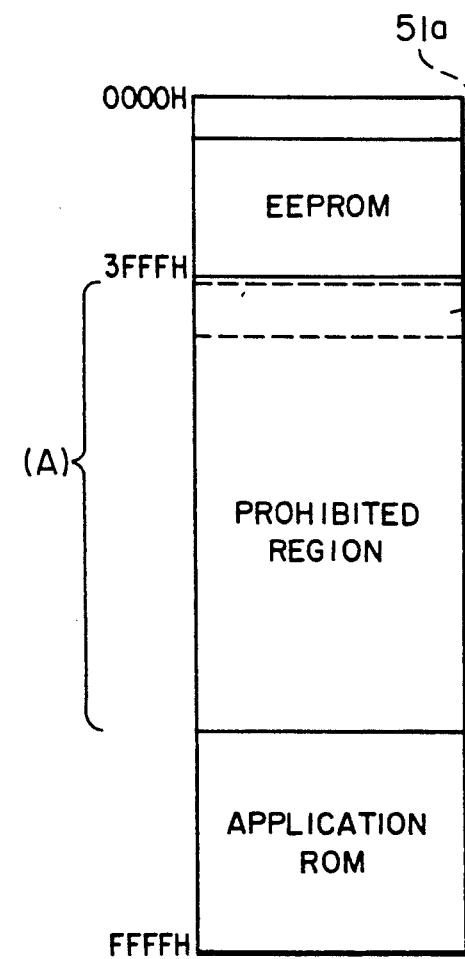

A mechanism for forming a region, in the EEPROM 5, to which no access can be obtained except during execution of the test program will be described with reference to FIG. 3 and FIGS. 4A, 4B which illustrate the corresponding memory maps of the EEPROM 5, system ROM 3, and the application ROM 4. Referring to FIG. 3, the F.F. circuit 103 stores one bit data. When a reset signal is supplied from outside of the IC card to the reset terminal P3 (see FIGS. 1 and 2) the CPU 1 is reset. After a release of this resetting, the output of the F.F. circuit 103 is held at level "H". When the F.F. circuit 103 then receives a reset signal from the first AND circuit 102, the output of the F.F. circuit 103 becomes level "L" until the CPU 1 is reset again. That is, after the release of the resetting of the CPU 1, the memory maps of the system ROM 3 and the application ROM 4 are as illustrated in FIG. 4A. The portion in which a pass code 51 is written in the EEPROM 5 corresponds to a region designated by the EEPROM (pass code) 51a. When there is no input signal in the branch routine 32 through the I/O terminal P5 after that, that is, if no signal representing a command to execute the test program 31 is received, the flow shifts to an application program 41, so that the CPU 1 accesses the execution start address in the application program 41. As shown in FIG. 4A, the addresses on the memory map of the application ROM 4 are included within a region between 4000H, and 7FFFH ("H" meaning hex, "4000H" and "7FFFH" whereby expressing hexadecimal numbers). Each address code train in the above region may be generally indicated as, for example, 01 * * * ***, that is, the uppermost address bit AD15 of all of the address codes in the above regions is "0" (meaning "L" level here) and the address bit AD14 which is lower by one digit from the uppermost address bit AD15 becomes "1" (meaning "H" level here). Therefore, the F.F. circuit 103 is reset and the output signal thereof becomes level "L", this condition then being maintained until the CPU 1 is reset again. As a result, the output of the second AND circuit 104, which is the uppermost address bit AD15a to be actually supplied to the address bus 2a, is maintained at "L" level, that is, maintained at "0". Thus, the region between the addresses 8000H to FFFFH on the memory map designated by A in the drawings, including the portion of the EEPROM (pass code) 51a in which the uppermost address bit is 1 cannot be accessed in any way. The memory map at this time is shown in FIG. 4B that the portions of EEPROM 5 except for the portion EEPROM (pass code) 51a can be accessed from the application program 41. Referring to FIG. 4A, the uppermost address bit of the address on the memory map of the system ROM 4 in which the test program 31 is stored is always "1". Therefore, during execution of the test program, no reset signal is transmitted from the first AND circuit 102 to the F.F. circuit 103, so that the portion EEPROM (pass code) 51a in which the pass word 51 is stored can be accessed.

Although in the above embodiment description was made regarding the uppermost address bit of the address and the next lowest address bit has been provided, the present invention is not limited thereto. It is only necessary that appropriate bits be selected from the address in accordance with the structure of the memory map and the position on the memory map of the region at which security is to be provided and that an address restriction circuit be provided for these address bit lines.

In general, the internal structure of the IC card including the address restriction circuit shown in FIG. 3 and according to the present invention can, of course, be formed on one semiconductor similarly to the conventional IC cards.

As described above, in the IC card in accordance with the present invention, an address restriction circuit is provided on the address bus of the IC card in order to create a region in the EEPROM to which access cannot be performed except during the execution of the test program, and the pass word is written in the thus-created region to provide security for the accessing of the test program. As a result, the pass code can be rewritten, but the pass code cannot be read or write from the application programs used by one or more users. Consequently, an IC card having greater security is provided.

What is claimed is:

1. An IC card including a test program for testing said IC card comprising:
    non-volatile memory means storing a pass code;
    read only memory means storing a test program for testing various functions of said IC card, at least one application program for executing various functions of said IC card, a branch routine for determining which of the test program and the at least one application program is to be executed in response to an external command, and a pass code confirmation routine for collating, before executing the test program, the pass code with a pass code input from outside of said IC card;
    resettable control means including address bit lines for executing and controlling the test program and the at least one application program;
    input/output control means for controlling input of signals to said IC card and output of signals from said IC card;
    signal transmitting means, including an address bus having a plurality of bit lines connected to corresponding address bit lines of said resettable control means, a data bus, and a plurality of control lines, connected to and for transmitting signals between said non-volatile memory means, said read only memory means, said resettable control means, and said input/output control means; and
    address restriction means for restricting values of address bits of predetermined bit lines of the address bus to prohibit accessing of one portion of said non-volatile memory means during execution of an application program, the pass code being stored in the portion of said non-volatile memory means, said address restriction means being connected to and between the address bit lines of said resettable control means and the address bit lines of said address bus.

2. An IC card according to claim 1 wherein said non-volatile memory means, said read only memory means, said control means, said input/output control means, and said address restriction means are all disposed on a single semiconductor substrate.

3. An IC card according to claim 1 wherein the predetermined bit lines include an upper bit line, the pass code has a pass code address, and the at least one application program has an application program address including an upper bit and a starting address, and said address restriction means comprises a circuit for detecting when the values of the predetermined bit lines of the address bus are the same as the starting address, and including a circuit for maintaining a bit value on said upper bit line prohibiting access to at least the portion of said non-volatile memory means until said resettable control means is reset in response to an external reset signal, and the pass code address is obtained by inverting the upper bit in the at least one application program address.

4. An IC card according to claim 3 wherein said non-volatile memory means, said read only memory means, said control means, said input/output control means, and said address restriction means are all disposed on a single semiconductor substrate.

5. An IC card securely storing programs comprising:
    a memory having a plurality of address locations and address bit lines carrying signals having values for selecting individual address locations within the memory wherein address locations within the memory define a memory map including a secure region and regions respectively storing protected data, a first program, a second program, and a branch program for determining which of the first program and the second program is to be executed in response to an external command;
    a central processing unit, including central processing unit address bit lines carrying signals having values for selecting individual address locations within the memory, for executing and controlling the first program, the second program, and the branch program, and for accessing the protected data;
    an address bus having a plurality of bit lines connected to corresponding address bit lines of the central processing unit and connected to the memory for transmitting signals between the memory and the central processing unit; and
    an address restriction circuit connected to and between the central processing unit address bit lines and the address bus bit lines for preventing signals carried by the memory address bit lines from having predetermined values during execution of the second program, regardless of the values of the signals carried by the central processing unit address bit lines, and for prohibiting access to the secure region of the memory by applying signals of fixed values to the memory address bus bit lines.

6. An IC card according to claim 5 wherein a pass code is stored in the secure region of the memory.

7. An IC card according to claim 5 wherein the second program has a second program starting address and the address restriction circuit prevents the address bus bit lines from carrying predetermined signal values in response to the same signal values as the second program starting address on the central processing unit address bit lines.

* * * * *